United States Patent Office 2,831,057
Patented Apr. 15, 1958

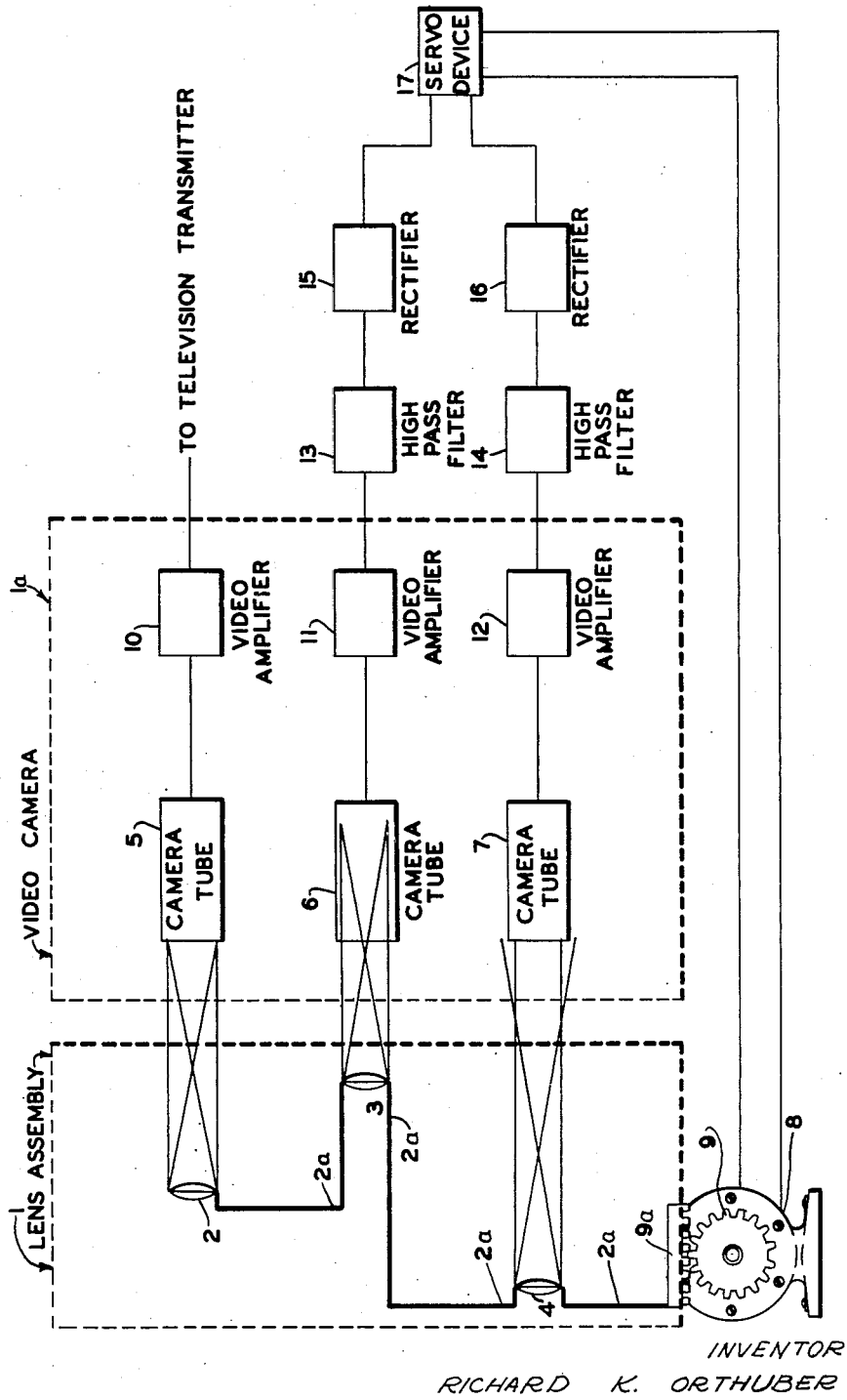

2,831,057

AUTOMATIC FOCUS ADJUSTER

Richard K. Orthuber, Fort Wayne, Ind., assignor to International Telephone and Telegraph Corporation, a corporation of Maryland Application September 22, 1952, Serial No. 310,774

6 Claims. (Cl. 178—7.2)

The present invention relates to automatic focusing of optical or electron-optical images and more particularly to an automatic focusing system adaptable to both television and photographic apparatus.

This invention has particular utility for the automatic adjustment of optical or electron-optical focus of cameras (television or photographic) and like image-forming instruments in which manual operation is entirely eliminated and chances for transmitting and reproducing unfocused images appreciably reduced. The elimination of operator attenuation is especially useful in the televising of closeup sport scenes in which the object being televised rapidly changes its position relative to the camera. Also, objects not accessible by operator attended cameras may be viewed in proper focus, without the necessity of an operator being present.

It is, therefore, an object of this invention to provide, in its broadest concept, an automatic focusing system for television cameras capable of maintaining optimum focus of a moving object. Ancillary to this, it is an object to provide an automatic focusing arrangement which will adjust automatically for proper focus of an object either moving or stationary.

It is a further object of this invention to provide a differential focusing system for camera apparatus which operates to achieve a balance between two opposite focusing condtions and which is sensitive to focus unbalance to return the system to a balanced condition.

It is another object to provide in a television apparatus an electrical balancing system sensitive to shifts in energy within the frequency band corresponding to the video-information of the scanned image whereby the system will functionally respond to such shifts and effect servo-operation of auxiliary apparatus.

It is still another object of this invention to provide in a television system an electrical automatic focusing adjuster which utilizes the degree of image definition as the source of initiating energy for effecting proper focusing adjustment.

In the accomplishment of this object, it is possible to use a television camera tube of the type which includes a photo-sensitive cathode upon which may be focused an optical image for producing an initiating signal utilized to effect focusing adjustment control of a primary picture-transmitting tube.

Other objects will become apparent as the description proceeds.

To the accomplishment of the above and related objects, my invention may be embodied in the form illustrated in the accompanying drawings, attention being called to the fact, however, that the drawings are illustrative only, and that specific change may be made in the specific constructions illustrated and described, so long as the scope of the appended claims is not violated.

In the drawings, the figure is a graphic illustration in block diagram of an embodiment of this invention.

Referring to the drawing, the electrical and mechanical components of the illustrated embodiment of this invention are shown in graphic form. This embodiment incorporates an integrated lens unit 1 comprised of three lenses 2, 3 and 4 which are laterally offset from each other and which are exposed to substantially the same optical subject or light pattern. These lenses are all mounted on a carriage 2a or the like in fixed relation to each other so that movement of the carriage will cause the lenses to move in unison. A suitable carriage might consist of a frame supported on wheels whereby the lenses may be maneuvered with respect to any selected object to be televised or photographed.

A picture signal generating tube 5, and control signal generating cameras 6 and 7 are also mounted on a common support 1a in fixed relation with each other but movable as a single unit with respect to the lenses 2, 3, and 4, tube 5 being optically associated with lens 2, tube 6 being optically associated with lens 3, and tube 7 being optically associated with lens 4. These tubes may be of any well known type such as image orthicons, image dissectors, iconoscopes, etc. The only limitation with respect to the type of tube used in this embodiment, is the fact that the tubes should be substantially identical in design. It will be learned hereafter that a different arrangement of tubes is possible for utilizing the principles of this invention, the present arrangement being explained as the most perspicuous but exepnsive arrangement.

The optical adjustment between the lenses and the respective associated pick-up tubes is so arranged that lens 2 projects an optical image within optimum focus in the plane of the photosensitive cathode of tube 5, lens 3 focuses an image of the same scene beyond the plane of the photosensitive cathode of tube 6 (a condition of "over focus"); and lens 4 focuses the same scene in front of the plane of the photosensitive element of tube 7 (a condition of "under focus"). The initial adjustment is such that the image planes of lenses 3 and 4 will be under and over focused, respectively, equal amounts.

A reversible servo-motor 8 which carries a pinion 9 on its power shaft is associated with the aforementioned lens assembly 1 and carriage 2a in such a manner as to operate the lenses forwardly or backwardly as conditions may require. The pinion 9 may be meshed with a gear rack 9a suitably affixed to the carriage 2a whereby operation of the motor 8 will result in movement of the carriage relative to the camera tube unit 1a. Essentially, the primary reason for using a motor 8 or the like is to provide a means for adjusting the relative distances between the lenses and the respective tubes for varying the degree of image definition on the various photosensitive cathodes. Other methods of controlling the movement of these parts are obvious and will occur to a person skilled in the art.

With the arrangement of the lens and tube units 1 and 1a, as described, the images scanned in the tubes 6 and 7 will possess less definition than the image in the tube 4, and the combination of the lens 2 and tube 5 may be the same as that of any television picture signal-generating camera arrangement in current use, the remainder of the illustrated system being an adjunct for maintaining the lens 2 in proper focused relation with respect to the tube 5.

The outputs of the three tubes 5, 6 and 7 are fed respectively into a video amplifier 10, and a control signal comparison circuit comprising amplifiers 11 and 12 which, for purposes of this explanation, may be identical in construction and performance, but, as will become apparent hereafter, need not necessarily be the same. The control signal comparison circuit comprises in addition to the two amplifiers 11 and 12, a utilization circuit including high-pass filters 13 and 14 which are connected to amplifiers 11 and 12 and which are coupled to a pair of rectifiers 15 and 16, respectively. The outputs of these rectifiers are in turn coupled into a servo-operating device 17 having two alternative operating positions which are coupled, respectively, to the servo-motor 8. By operating the device 17 to select one or the other of its two positions, the motor 8 will be energized to rotate in one of its two directions of rotation. Any servo-operating mechanism having proper operating characteristics may be used for the device 17, and the exact type of construction needed will become apparent from the explanation to follow hereafter.

The filters 13 and 14 are preferably designed to pass frequencies in the two to four megacycle range, but as will become apparent from the description to follow, other suitable bands of frequencies may be utilized to achieve the desired operation of this invention.

For proper focus of lens 2 on tube 5, the defocused images on tubes 6 and 7 produce substantially identical outputs from amplifiers 11 and 12, filters 13 and 14, and rectifiers 15 and 16 which feed the servo-device 17. By mixing or comparing the parameters of the outputs of the rectifiers 15 and 16, the servo-device 17 will not be operated and no error signal will be coupled to the motor 8 for controlling the direction of rotation thereof.

Assuming now that the optical subject to be televised or photographed approaches the camera, the focus of lenses 2 and 3 on the respective tubes will deteriorate; the focus of lens 4 will improve. With the occurrence of this condition, the amplitude of the 2 to 4 megacycle energy in the outputs of amplifier 12 and filter 14 rises, and the energy output for the same frequency range of filter 13 decreases. The resulting unbalance now produced in the outputs of the rectifiers 15 and 16 is used to feed an error signal into servo-device 17 which effects energization of the motor 8. The direction of energization of motor 8 is such that the complete lens arrangement 1 (or carriage) will be driven to the left until the definition defect or defocused condition in tubes 6 and 7 are equal and opposite. Upon attainment of this equalization, the outputs of rectifiers 15 and 16 are made equal and opposite and the lens 2 is adjusted for optimum focus.

By assuming that the object being televised or photographed recedes from the lens system, the reverse conditions may be shown to occur, with the motor 8 being energized in the opposite direction, to move the lens system toward the tube assembly. Thus, the position relationship between the televised subject and the lens system determines the direction in which the motor 8 will be energized, energization occurring whenever an unbalanced rectifier output is fed into the servo-device 17. This servo-device 17 is sensitive, in the preferred arrangement, to polarity relationship between the magnitudes of the outputs of rectifiers 15 and 16, and responds to relative polarity changes or changes in magnitudes to produce selective operation of the motor 8.

In particular, one form of servo-device 17 may comprise essentially a single pole double throw electric relay switch in which the two fixed contacts are connected to the two reversing leads, respectively, leading to the motor 8, and in which the movable armature contact is connected to a source of motor-energizing potential. Two relay magnet coils arranged on opposite sides of the armature have connections to the two rectifiers 15, 16, respectively, whereby equal output signals from the rectifiers will hold the armature in between and out of engagement with said fixed contacts. Thus, if the signal from one rectifier should increase in intensity, the magnet associated therewith would move the armature into engagement with the corresponding fixed contact. The converse will be true for an unbalance between rectifiers in the opposite direction. This arrangement may be characterized as a conventional motor-reversing relay switch, and other arrangements may obviously be used without departing from the scope of this invention.

In the foregoing embodiment the three lenses and pick-up tubes having been considered as being identical. This is, however, not necessary. The focal length of each of the adjustor lenses 3 and 4 may be different from the picture transmitting or pickup lens 2, in which case the correcting motions produced by the motor 8 must be geared either upwardly or downwardly differently for the transmitting and adjusting lens systems according to the ratio of the focal lengths.

It is possible to further modify the embodiment as described in the foregoing, by using pick-up tubes in the adjustor section which are identical to each other but different from the main tube 5. For example, an image orthicon camera tube may be used at 4, while image dissector tubes or iconoscopes may be used for the tubes 6 and 7. The operational requirement of the tubes 6 and 7 is that each tube be sensitive to changes in picture definition so as to produce variations in amplitude within the desired band of frequencies for initiating the controlling action heretofore explained.

As is now apparent, applicant's contribution to the art is of broad significance, and it will appear obvious to any person skilled in the art as to how the specific details of the constructions described in the foregoing may be modified to achieve the desired end result without departing from the true scope of this invention.

It will be understood by the person skilled in the art that the system of the foregoing incorporates electronic scanning of an electron image in order to produce the differences in energy levels corresponding to image definition, needed to initiate the focus-controlling action. Similarly, the well known expedient of mechanical scanning, in which a small ray of light from a scanning plate is projected onto a photo cell type tube, may be used in this invention in place of the electronic scanning tubes previously described. In this latter alternative, the lens system is focused with respect to the scanning discs so that an increase in image definition in the plane of a given disc will provide the necessary variation in light intensity for obtaining the error signal from the associated equipment for correcting the focus on the primary pick-up tube.

In the mechanical scanning system, the use of a narrow slot in place of a circular or square scanning opening is preferred, since the slot accommodates more light thereby increasing the sensitivity of the system. The sensitivity may be further increased by moving the scanning slot in such a manner that it will cross boundaries or contours between different image light levels in substantial parallel relation therewith. This may be exemplified by considering a light pattern made up of dark and light sections separated by a straight line contour. The preferred method of scanning these sections would be such as to dispose the slot parallel to this separation line and to move the slot across the line in a direction normal thereto. The differential energy level of the light admitted by the slot would be effectively measured as explained previously to produce the desired end focusing result.

Various devices will occur to the person skilled in the art as to how irregular image contours may be scanned, the important requirement being that the contours be scanned with the slot substantially parallel thereto. A suitable mechanical arrangement for scanning irregular images is a disc revoluble about its axis and provided with a plurality of suitable scanning slots radiating from its center. The axis of the disc is simultaneously rotated about a circle encompassing the image field. With this arrangement, each contour line would be properly scanned twice for each revolution of the disc axis thereby providing usable signals for focusing purposes.

What is claimed is:

1. In an automatic focus adjusting system for television camera apparatus, a picture signal-generating camera and two control signal-generating cameras, a first lens means for focusing an optical image on the cathode of said picture signal generating camera, second and third lens means arranged to focus the same image in two different planes with respect to the cathodes of said control signal-generating cameras, said cathodes producing signals representative of the degree of focus of said image in said two different planes, utilization means coupled to said control signal-generating cathodes and responsive to variations in parameters of said signals to generate a control voltage, a motor coupled to said utilization means and responsive to said voltage for changing the focus of said optical image on the picture signal-generating camera in accordance with the aforementioned variations in parameters.

2. In an automatic focus adjusting system for television camera apparatus, a picture signal-generating camera having a photo-sensitive cathode, control signal-generating means provided with photo-sensitive electrodes, a first lens device for focusing an optical image on said photo-sensitive cathode, a second lens system for simultaneously focusing said image equal predetermined distances behind and in front, respectively, of the aforesaid photo-sensitive electrodes for generating two separate signals which are functions of defocus, the lenses being mounted for movement in unison, a circuit coupled to said control signal-generating means for comparing the aforementioned signals and supplying an error signal representative of the defocused relationship of the images, and means including a servo-motor responsive to said error signal operatively coupled to said lens system for adjusting the focus.

3. In an automatic focus adjusting system for television camera apparatus, a picture signal-generating camera and a pair of control signal-generating cameras, a first lens system for focusing an optical image on the cathode of said picture signal-generating camera, a second lens system for focusing said image in a plane a predetermined distance behind the plane of the cathode of one of said control signal-generating cameras, a third lens system for focusing said image in a plane a predetermined distance in front of the plane of the cathode of the other control signal-generating camera, said first, second and third lens systems being mounted for movement in unison, a circuit connected to said control cameras for comparing the control signals and generating an error signal representative of unequal defocused relationship between said second and third lens systems, and servo-motor means responsive to said error signal for driving said lens systems.

4. An automatic focus adjusting mechanism comprising a plurality of cameras, each camera having a photo-sensitive electron discharge device and a lens system, means coupled to one of said cameras for transmitting video intelligence, another of said cameras focused to the rear of the scene to be transmitted, and a third camera being focused upon a plane in front of the scene to be transmitted, means to compare the output signals of the second and third mentioned cameras coupled, respectively, to the outputs of said second and third cameras, a servo-motor mechanically coupled to and driving the lens systems of said cameras, and connections between said comparing means and said servo-motor.

5. In combination, a television camera with a first lens and a photocathode, means for focusing the lens on said photocathode comprising a second and third lens unitarily mounted with the first lens to view a common scene, a second and a third photocathode in the optical paths, respectively, of the second and third lenses, said second and third lenses being focused, respectively, on planes ahead of and to the rear of said second and third photocathodes when said first lens is in focus on the first mentioned photocathode; a servo-motor mechanically driving the unitarily mounted lenses, a filter coupled to each of the second and third photocathodes, said filters being selective of frequencies in the video range of frequencies of the photocathodes, means comparing the amplitudes of the frequencies passed by said filters, with connections to said servo-motor.

6. In combination in a video system for viewing a scene and generating a video signal thereof, a first means for deriving a signal the amplitude of which is a function of the degree of optical focus of the light image of said scene on a first plane, a second means for deriving a signal, the amplitude of which is a function of said image on a second plane displaced from said first plane, means comparing the relative amplitudes of the signals of said first means and second means, and a servo-motor mechanically coupled to the focusing means of the system and electrically connected to said comparing means.

References Cited in the file of this patent

UNITED STATES PATENTS

| | | |
|---|---|---|
| 2,134,757 | Goldsmith | Nov. 1, 1938 |
| 2,403,628 | Beers | July 9, 1946 |